(12) United States Patent
Kobayashi

(10) Patent No.: US 9,120,380 B2
(45) Date of Patent: Sep. 1, 2015

(54) DISPLAY CONTROL DEVICE

(71) Applicant: YAZAKI CORPORATION, Minato-ku, Tokyo (JP)

(72) Inventor: Ryo Kobayashi, Shimada (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/488,892

(22) Filed: Sep. 17, 2014

(65) Prior Publication Data

US 2015/0088376 A1    Mar. 26, 2015

(30) Foreign Application Priority Data

Sep. 26, 2013 (JP) .................................. 2013-200256

(51) Int. Cl.
| | |
|---|---|
| *G06F 7/00* | (2006.01) |
| *B60Q 1/00* | (2006.01) |
| *B60K 37/02* | (2006.01) |
| *G01C 22/02* | (2006.01) |
| *G01D 7/00* | (2006.01) |
| *G01D 13/22* | (2006.01) |
| *G01F 23/00* | (2006.01) |
| *G01P 1/08* | (2006.01) |

(52) U.S. Cl.
CPC ................ *B60K 37/02* (2013.01); *G01C 22/02* (2013.01); *G01D 7/00* (2013.01); *G01D 13/22* (2013.01); *G01F 23/00* (2013.01); *G01P 1/08* (2013.01)

(58) Field of Classification Search
CPC .......... B60Q 9/005; B60Q 1/00; B60Q 9/008; G06F 7/00; B60K 37/02; G01F 23/00; G01P 1/08; G01C 22/02; G01D 13/22; G01D 7/00
USPC ........... 701/400–541, 1, 36, 29; 340/988–996
See application file for complete search history.

(56) References Cited

U.S. PATENT DOCUMENTS

2005/0228556 A1* 10/2005 Kojima ........................... 701/29

FOREIGN PATENT DOCUMENTS

| JP | 2007-153116 | * | 6/2007 |
| JP | 2007-153116 | A | 6/2007 |

* cited by examiner

*Primary Examiner* — Muhammad Shafi
(74) *Attorney, Agent, or Firm* — Sughrue Mion, PLLC

(57) ABSTRACT

In an adjustment mode, a control unit of a display control device displays, on a display, frame bodies imitating shapes of measuring instruments, and changes the display positions or/and the shapes at which or in which the frame bodies are displayed on the basis of input operation received by the input unit, and stores, to the parameter storage unit, the determined display positions or/and the determined shapes of the frame bodies as parameters of the display positions or/and the shapes of the measuring instruments.

7 Claims, 5 Drawing Sheets

DISPLAY CONTROL DEVICE

CROSS-REFERENCE TO RELATED APPLICATIONS

The present application claims priority to and incorporates by reference the entire contents of Japanese Patent Application No. 2013-200256 filed in Japan on Sep. 26, 2013.

BACKGROUND OF THE INVENTION

1. Field of the Invention

The present invention relates to a display control device which can be used for a display device such as a meter unit of a vehicle, and more particularly, to a technique for appropriately controlling the arrangement state of display elements such as measuring instruments.

2. Description of the Related Art

In general, a meter unit having various kinds of measuring instruments such as a speedometer and an engine tachometer are provided as display devices in front of the driver's seat of a vehicle. In recent years, a meter unit often uses a display device such as a liquid crystal display capable of graphic display. More specifically, a measuring instrument is graphically displayed by associating a combination of pixel groups in a particular area among many display pixels constituting a screen of a display with various display patterns such as an indicating needle and a scale of a measuring instrument.

A conventional technique of a meter unit for a vehicle that employs a graphic display is, for example, disclosed in Japanese Patent Application Laid-open No. 2007-153116. Japanese Patent Application Laid-open No. 2007-153116 suggests such technique that, when display aspects such as a display size and a display position of an image of each measuring instrument in the meter unit are changed, the display contents before and after the change can be easily recognized.

By the way, for example, in order to improve the visibility of a display content, a meter unit for a vehicle needs to effectively reduce light coming from the outside such as sunlight incident upon the display screen. Therefore, for example, an exterior component having a light blocking effect may be provided to encircle the periphery of the display screen of the meter unit.

In some cases, in order to make a specially designed meter unit, for example, an exterior component in a shape covering the entire display screen may be provided, and opening portions may be made in the exterior component in such a manner that only the measuring instruments of the meter unit are exposed through the opening portions. In this case, a user such as a driver can see the measuring instruments through the opening portions of the exterior component. The periphery of each measuring instrument is covered with the exterior component.

However, when an exterior component is formed, the position of an opening portion may deviate from a design value. When the main body and the exterior component of the meter unit are attached to the vehicle body, the positions thereof may deviate relatively from each other. When such deviation in terms of position occurs, the position of each measuring instrument displayed at the position exposed in the opening portion of the exterior component may deviate relatively in the horizontal direction or in the vertical direction with respect to the designed state. As a result, the measuring instrument display position may deviate from the exterior component, and the measuring instrument is displayed in such state that the balance of the position is unnatural in the entire device. Alternatively, a part of the displayed measuring instrument may be covered with the peripheral portion of the opening portion of the exterior component and cannot be seen.

When the deviation in terms of position occurs as explained above, a worker finely adjusts the attachment position of the exterior component and the like in conventional techniques. However, when the deviation in terms of position and the distortion is relatively high, or the deviation in terms of position and the distortion occurs only in some of multiple measuring instruments, the adjustment cannot be made, and the malfunction of display of the measuring instrument cannot be solved. Therefore, for example, in some cases, the exterior component has to be replaced with another component. The deviation in terms of position and the distortion occurs in different manners depending on the exterior components. Therefore, the yield of the exterior components may be reduced, or additional replacing work is required, or physical adjustment work is required, which results in the increase of the production cost.

SUMMARY OF THE INVENTION

The present invention is made in view of the above circumstances, and it is an object of the present invention to provide a display control device capable of solving the problem of the deviation in terms of position that occurs when the exterior component is formed and the deviation in terms of position during attachment of components by performing only a simple operation.

According to one aspect of the present invention, a display control device includes: a display capable of displaying a measuring instrument; an exterior component which includes an opening portion for making the measuring instrument displayed on the display to be visible and to which the display is attached; a control unit configured to control display of the display; a parameter storage unit capable of holding a parameter concerning the measuring instrument; and an input unit configured to receive input operation, wherein in an adjustment mode, the control unit displays, on the display, a frame body imitating a shape of the measuring instrument, changes a display position or/and a shape at which or in which the frame body is displayed, on the basis of input operation received by the input unit, and stores, to the parameter storage unit, the determined display position or/and the determined shape of the frame body as a parameter of the display position or/and the shape of the measuring instrument, and in a normal display mode other than the adjustment mode, the control unit reflects the parameter held in the parameter storage unit as the display position or/and the shape of the measuring instrument displayed on the display.

According to another aspect of the present invention, in the adjustment mode, the control unit displays frame bodies respectively corresponding to a plurality of measuring instruments at positions different from each other on the display, independently changes the display positions or/and the shapes of the frame bodies, and stores, to the parameter storage unit, the determined display positions or/and the determined shapes of the frame bodies as the parameters concerning the display positions or/and the shapes of the measuring instruments corresponding to the frame bodies, and in the normal display mode, the control unit displays the plurality of measuring instruments on the display.

According to still another aspect of the present invention, the frame bodies are similar to the shapes of the opening portions and are slightly smaller than the opening portions, and two crossing line segments are drawn inside of the frame bodies.

The present invention has been hereinabove explained briefly. Further, the details of the present invention will be more clearly understood by reading through a mode for carrying out the invention explained below (hereinafter referred to as an "embodiment") with reference to attached drawings.

DETAILED DESCRIPTION OF THE PREFERRED EMBODIMENTS

A specific embodiment of a display control device according to the present invention will be explained below with reference to drawings.

[Explanation about Overview of Device]

The present embodiment will be explained while assuming a case where the display control device according to the present invention is applied to a meter unit 100 for vehicles. The meter unit 100 is a device having measuring instruments for displaying information required when driving a vehicle, and is arranged on an instrument panel in front of a driver's seat so that the driver can easily see the display content.

[External Appearance of Display Screen 101 of Meter Unit 100]

Figure 2:
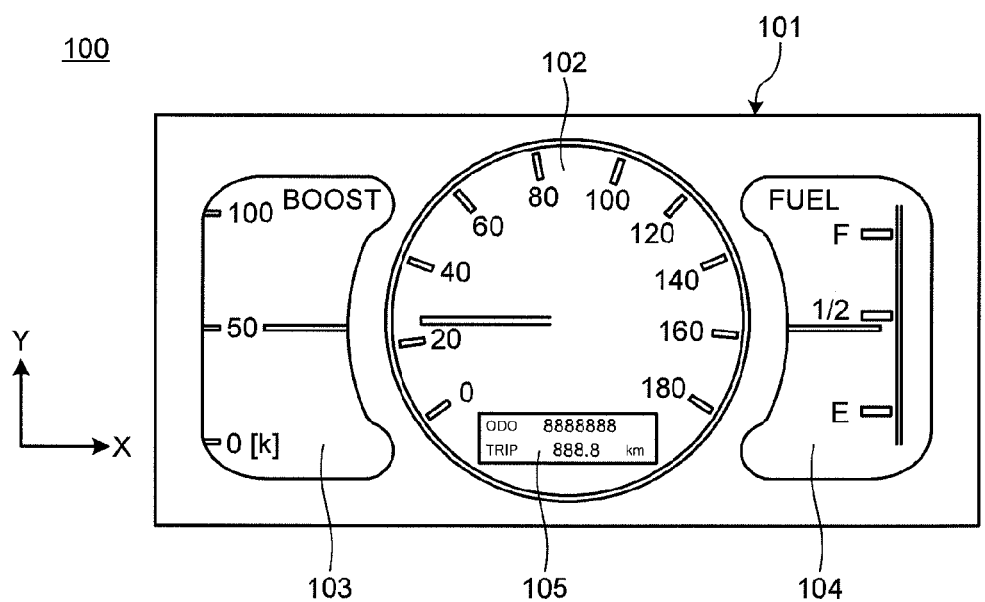
FIG. 2 is a front view illustrating a specific example of an external appearance of a meter unit including the display control device.

A specific example of the display screen 101 of the meter unit 100 is shown in FIG. 2 when it is seen front the front side. The display screen 101 is a display unit of a liquid crystal display device 121 explained later, and can display various kinds of visible information on a flat surface in a rectangular shape.

In the display screen 101 as shown in FIG. 2, a speedometer display unit 102 in the circular shape is arranged in the central portion. At the left side of the speedometer display unit 102, a boost meter display unit 103 is arranged. At the right side of the speedometer display unit 102, a fuel gauge display unit 104 is arranged. A distance meter display unit 105 is arranged in a circular area of the speedometer display unit 102.

As shown in FIG. 2, the speedometer display unit 102 can display a speedometer constituted by visible pattern information such as an indicating needle, a scale, and numbers. The speedometer display unit 102 can perform control so as to update the display content so that the display position of the pointing end of the indicating needle moves along the scale, whereby the indicating needle points a desired speed value.

Likewise, the boost meter display unit 103 can display a measuring instrument having a function of a boost meter. The fuel gauge display unit 104 can display a measuring instrument having a function of a fuel gauge. The distance meter display unit 105 can display numerical values of the total travel distance meter (odometer) and the trip meter.

[External Appearance when Exterior Component is Attached]

Figure 3:
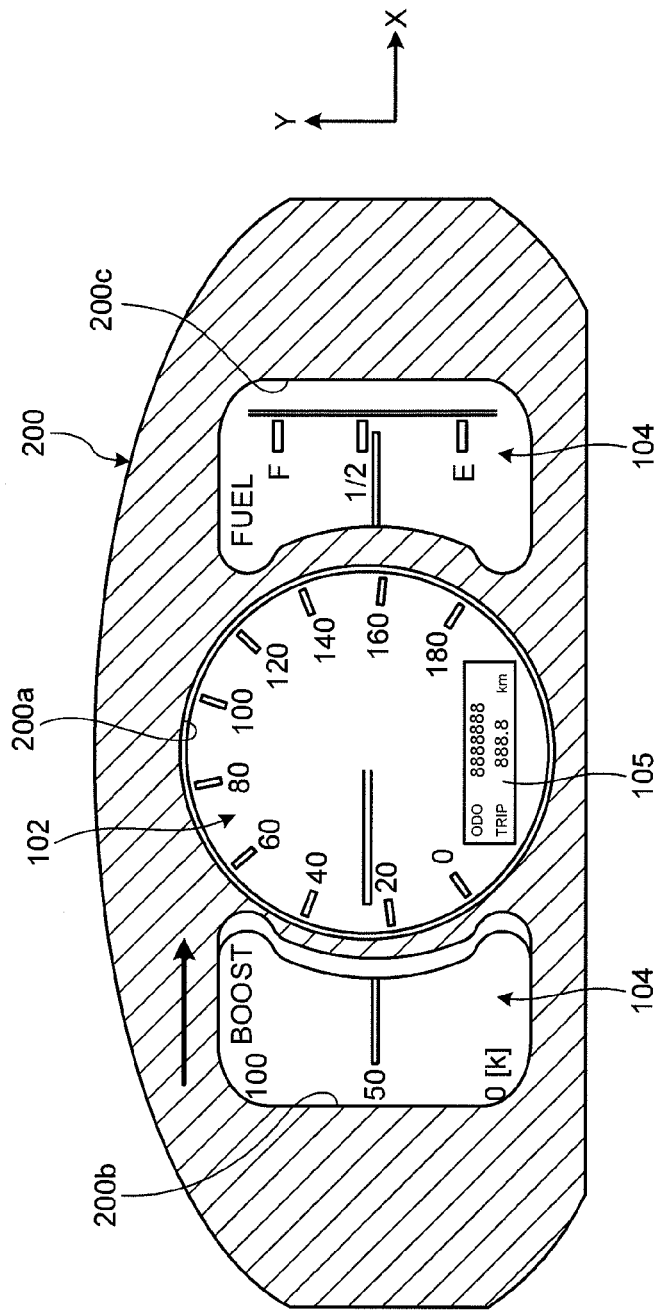
FIG. 3 is a front view illustrating an external appearance of the meter unit when an exterior component is attached.

The external appearance of the display screen 101 of the meter unit 100 when an exterior component 200 is attached is shown in FIG. 3.

When the meter unit 100 is actually mounted on the vehicle, for example, the exterior component 200 in such a shape as to cover the entire meter unit 100 is attached in order to reduce the light coming from the outside and incident upon the display screen 101, improve the contrast of the display, and enhance the decorative feature. This exterior component 200 is usually constituted by a material having a light blocking effect such as a resin, and is arranged to cover the display screen 101.

However, the areas of the speedometer display unit 102, the boost meter display unit 103, the fuel gauge display unit 104, and the like on the display screen 101 are required to be seen by the driver, and therefore, at portions where the exterior component 200 overlaps the surface of the display screen 101, multiple opening portions 200a, 200b, and 200c are formed in the exterior component 200.

More specifically, the driver sees the meter unit 100 having the external appearance as shown in FIG. 3, and therefore, the user can see the speedometer display unit 102 exposed through the opening portion 200a, the boost meter display unit 103 exposed through the opening portion 200b, and the fuel gauge display unit 104 exposed through the opening portion 200c.

The opening portions 200a, 200b, and 200c formed in the exterior component 200 are designed to match the shapes, the display positions, and the sizes of the areas of the speedometer display unit 102, the boost meter display unit 103, and the fuel gauge display unit 104, respectively.

However, when the exterior component 200 is produced, the positions of the opening portions 200a, 200b, and 200c may deviate from the design values, and distortions may occur in the portions of the opening portions 200a, 200b, 200c, and the like, and the aperture shapes may deviate from the design values. Even when there is no deviation in terms of position and no distortion in the exterior component 200 itself, the deviation in terms of position may occur relatively between the meter unit 100 and the exterior component 200 when a worker assembles the meter unit 100 and the exterior component 200 or when a worker attaches the meter unit 100 and the exterior component 200 to a vehicle.

For example, when a relative deviation in terms of position occurs between the area of the boost meter display unit 103 and the opening portion 200b in the state as shown in FIG. 3, a part of the boost meter display unit 103 is covered with the peripheral portion of the opening portion 200b, and the covered portion cannot be seen by the driver. Alternatively, there may be a gap around the boost meter display unit 103, or the boost meter display unit 103 may not look good. The above is also applicable to the opening portions 200a, 200c.

The meter unit 100 according to the present embodiment has a special function explained later for eliminating the influence of the deviation in terms of position, the distortion, and the like between the opening portions 200a, 200b, and 200c and the speedometer display unit 102, the boost meter display unit 103, and the fuel gauge display unit 104 displayed on the display screen 101 by just performing a simple adjustment operation.

[Example of Configuration of Electric Circuit]

Figure 4:
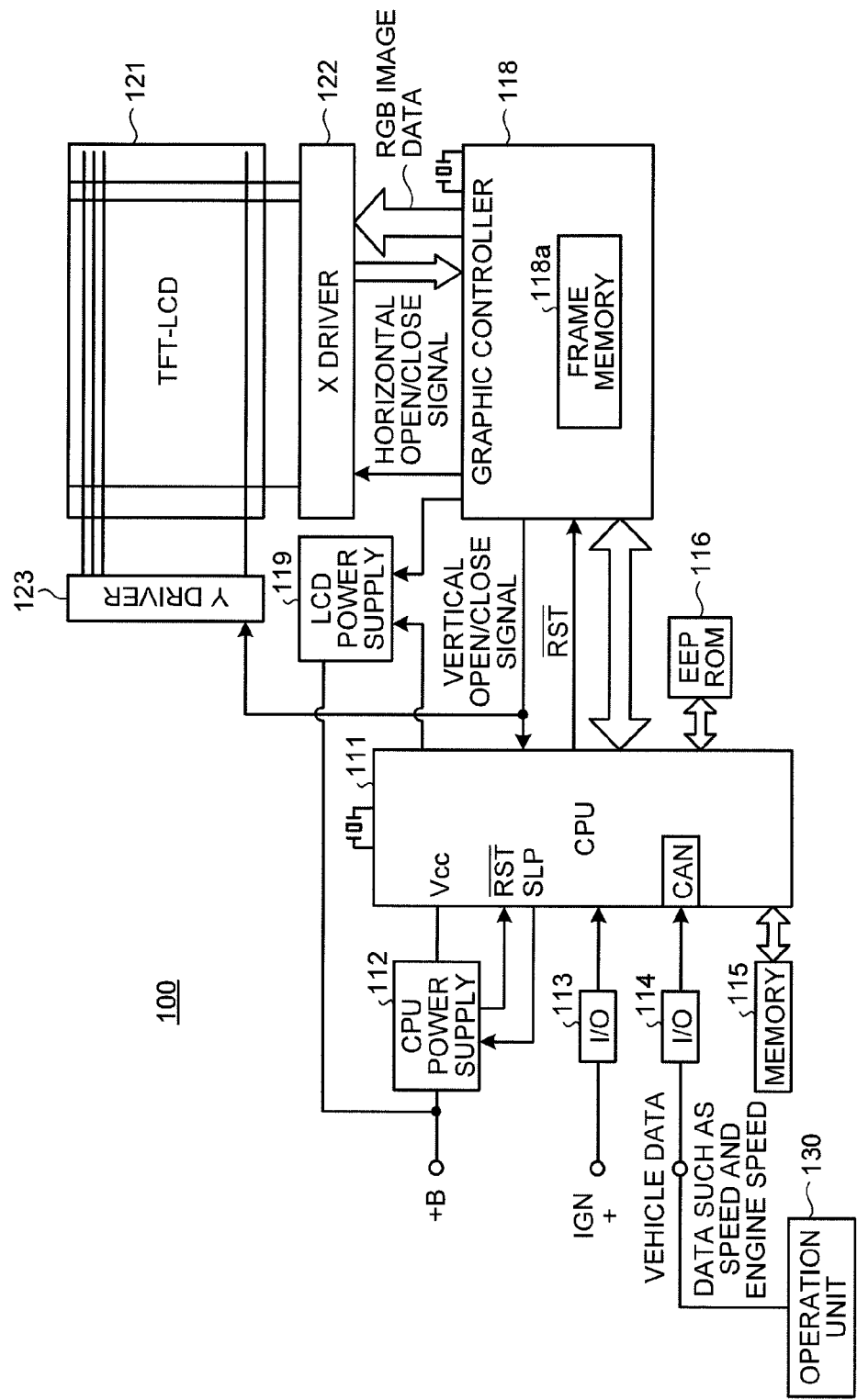
FIG. 4 is a block diagram illustrating an example of configuration of an electric circuit of the meter unit.

An example of configuration of an electric circuit of the meter unit 100 will be shown in FIG. 4. As shown in FIG. 4, this meter unit 100 includes a microcomputer (CPU) 111, a CPU power supply 112, an I/O unit 113, an I/O unit 114, a temporary storage memory 115, a nonvolatile memory (EEPROM: Electrically Erasable Programmable Read Only Memory) 116, a graphic controller 118, an LCD power supply 119, the liquid crystal display device (TFT-LCD) 121, an X driver 122, a Y driver 123, and an operation unit 130.

The microcomputer 111 executes a control program prepared in advance to achieve various kinds of functions required by the meter unit 100. More specifically, in a normal mode, the microcomputer 111 collects, via the I/O unit 114, the latest vehicle data including the vehicle speed, the boost value, the remaining fuel, the travel distance, and the like, and executes necessary calculation, thus generating data to be displayed. Then, the obtained information is reflected in the display content of each display unit on the display screen 101 of the liquid crystal display device 121. In an adjustment mode prepared separately, the microcomputer 111 receives input operation from the operation unit 130 and allows for adjustment of parameters of the display modes of the speedometer display unit 102, the boost meter display unit 103, the fuel gauge display unit 104, and the like. The content of the control will be explained later in details.

The CPU power supply 112 receives a direct current electric power (+B) provided from the power supply circuit at the vehicle side, and generates a stable direct current voltage (Vcc) required for operation of the circuits such as the microcomputer 111. The CPU power supply 112 can generate a reset signal and provide it to the microcomputer 111, and can control the voltage according to the sleep control signal which is output from the microcomputer 111.

The I/O unit 113 performs signal processing for converting an ignition signal (IGN+), which is output from the vehicle side, into a voltage that can be received by the microcomputer 111.

The I/O unit 114 performs the signal processing required to connect the microcomputer 111 to the communication network (CAN: Controller Area Network) on the vehicle. The microcomputer 111 has a communication function supporting the CAN standard. Therefore, the microcomputer 111 can communicate with various kinds of electronic control devices (ECU, not shown) on the vehicle via the communication network on the vehicle and the I/O unit 114. For example, vehicle data such as the speed of the vehicle, the engine speed, and the like can be obtained by this communication.

In the present embodiment, when the adjustment mode is executed, the operation unit 130 can be connected to the I/O unit 114. The operation unit 130 includes multiple buttons which are not shown. An adjusting person can give a command for a parameter adjustment to the microcomputer 111 by operating the buttons of the operation unit 130.

The temporary storage memory 115 is constituted by a memory (RAM) from which data can be read and to which data can be written. The microcomputer 111 can temporarily store various data to the temporary storage memory 115, and can read data from the temporary storage memory 115.

Figure 1:
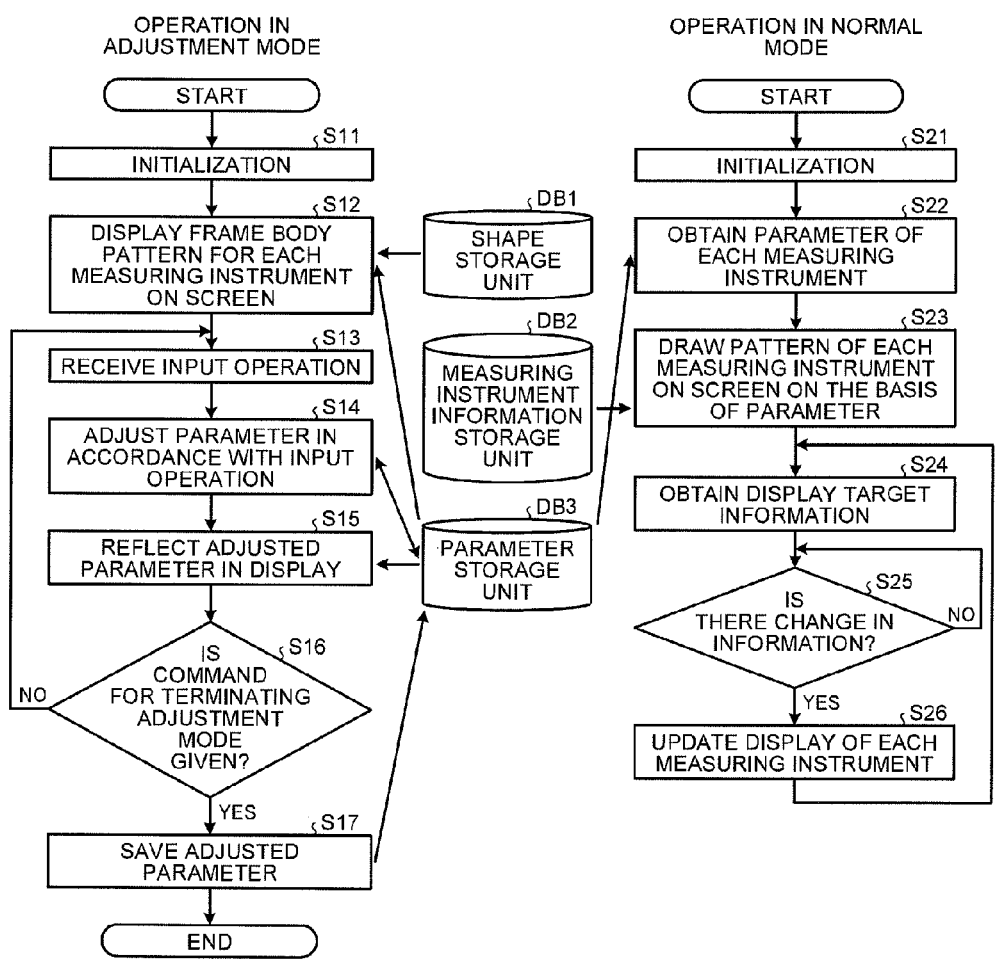
FIG. 1 is a flowchart illustrating a content of main control in a display control device according to an embodiment.

The nonvolatile memory 116 is constituted by an EEPROM, and is used to hold various fixed data used by the meter unit 100. More specifically, programs executed by the microcomputer 111 and fixed data such as various kinds of constant are written to the nonvolatile memory 116 in advance. The nonvolatile memory 116 is also provided with an area for storing data of various kinds of parameters which can be updated. More specifically, the nonvolatile memory 116 is provided with areas of a shape storage unit DB1, a measuring instrument information storage unit DB2, and a parameter storage unit DB3 as shown in FIG. 1.

Figure 5:
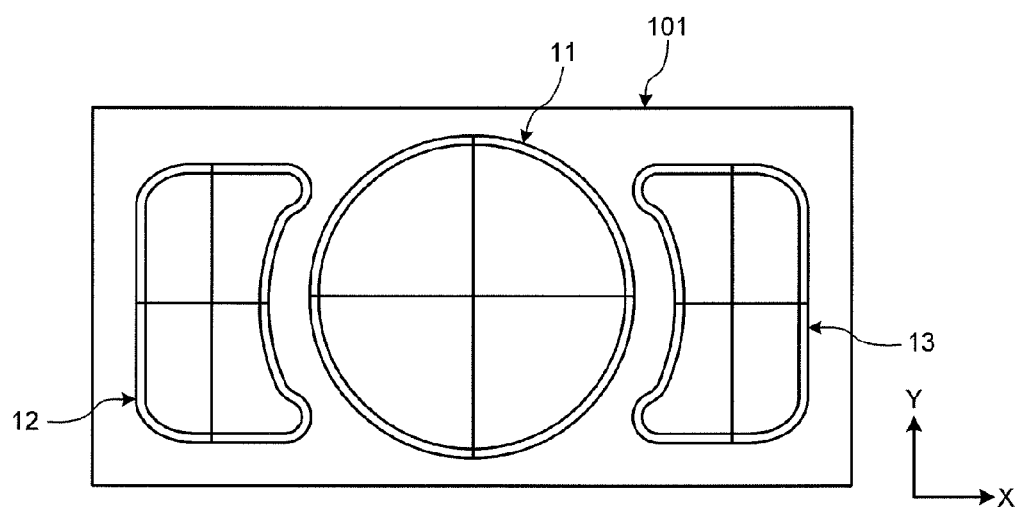
FIG. 5 is a front view illustrating an example of a screen display in an adjustment mode of the meter unit.

The shape storage unit DB1 is an area for holding basic shape data of frame body patterns 11, 12, and 13 as shown in FIG. 5, and holds basic shape data determined in advance so as to be in conformity with the design values of the opening portions 200a, 200b, 200c.

The measuring instrument information storage unit DB2 holds information about indicating needle pattern, scale pattern, character pattern, layout for each measuring instrument displayed on the speedometer display unit 102, the boost meter display unit 103, the fuel gauge display unit 104, and distance meter display unit 105.

The parameter storage unit DB3 can hold parameters such as a correction value of a display reference coordinate (X/Y), an X axis direction size correction value, a Y axis direction size correction value, and the like for each of the speedometer display unit 102, the boost meter display unit 103, and the fuel gauge display unit 104. These parameters can be updated in the adjustment mode.

The liquid crystal display device 121 as shown in FIG. 4 has a two-dimensional arranged display screen 101 constituted by many pixels arranged in the horizontal (X) direction and the vertical (Y) direction, and each of many pixels can individually switch the density (or the brightness) or the display color in accordance with the control given from the outside.

The graphic controller 118 controls the content displayed on the display screen 101 of the liquid crystal display device 121. The graphic controller 118 includes a frame memory 118a which holds data corresponding to the content of all the pixels of a single frame of the display screen 101. The graphic controller 118 draws data, which are to be displayed, on the frame memory 118a in accordance with a command which is output from the microcomputer 111. Then, the graphic controller 118 outputs a signal (RGB image data) corresponding to each piece of data on the frame memory 118a to the liquid crystal display device 121 in synchronization with timing of the vertical synchronization signal and the horizontal synchronization signal generated internally.

The graphic controller 118 is connected to the liquid crystal display device 121 via the X driver 122. The X driver 122 determines the scanning position in the horizontal direction in the pixel group of the liquid crystal display device 121 in synchronization with timing of the horizontal synchronization signal which is output from the graphic controller 118.

The Y driver 123 is also connected in order to select each line in order in the Y direction (Y direction scanning) in the pixel group of the liquid crystal display device 121. The Y driver 123 selects each line in the Y direction in order in synchronization with the timing of the vertical synchronization signal which is output from the graphic controller 118.

The LCD power supply 119 receives the direct current electric power (+B) provided from the power supply circuit at the vehicle side, and generates a stable voltage required for operation of the liquid crystal display device 121 and a backlight, not shown.

[Explanation about Operation of Device]
[Overview of Operation]

The content of main control with the display control device according to the embodiment is shown in FIG. 1. More specifically, the microcomputer 111 shown in FIG. 4 executes the control as shown in FIG. 1, so that the meter unit 100 performs predetermined operation.

As shown in FIG. 1, the microcomputer 111 can execute the control in the "adjustment mode" and the control in the "normal mode". In the "normal mode", predetermined measuring instruments are displayed in the speedometer display unit 102, the boost meter display unit 103, the fuel gauge display unit 104, and distance meter display unit 105 on the display screen 101 as shown in FIG. 2. Then, as shown in FIG. 3, a user such as a driver can actually see the displays of the measuring instruments in the areas of the opening portions 200a, 200b, and 200c of the exterior component 200.

In the "adjustment mode", visible information as shown in FIG. 5 is displayed on the display screen 101 of the meter unit 100. On the display screen 101 as shown in FIG. 5, three frame body patterns 11, 12, and 13 are displayed on the screen. In the initial state, the three frame body patterns 11, 12, and 13 are displayed at the same positions as the area of the speedometer display unit 102, the area of the boost meter display unit 103, and the area of the fuel gauge display unit 104, respectively, in the design values.

The frame body pattern 11 is a frame-shaped pattern in the external contour shape of the speedometer display unit 102 and in the circular shape similar to the opening shape of the opening portion 200a, and the size of the frame body pattern 11 is also equivalent to the external shape of the speedometer display unit 102 and the opening portion 200a. The frame body pattern 12 is a frame-shaped pattern in the external contour shape of the boost meter display unit 103 and in the shape similar to the opening shape of the opening portion 200b, and the size of the frame body pattern 12 is also equivalent to the external shape of the boost meter display unit 103 and the opening portion 200b. The frame body pattern 13 is a frame-shaped pattern in the external contour shape of the fuel gauge display unit 104 and in the shape similar to the opening shape of the opening portion 200c, and the size of the frame body pattern 13 is also equivalent to the external shape of the fuel gauge display unit 104 and the opening portion 200c. The shapes of these frame body patterns 11, 12, 13 are similar to the shapes of the opening portions 200a, 200b, 200c, respectively, and are slightly smaller than the opening portions 200a, 200b, 200c. Two crossing line segments are drawn inside of these frame body patterns 11, 12, 13.

Like the case of FIG. 3, in the "adjustment mode", the surface of the display screen 101 is covered with the exterior component 200. Therefore, like the case of FIG. 3, in the display screen 101 actually seen by the adjusting person, the frame body pattern 11 is displayed at the position substantially matching the opening portion 200a, the frame body pattern 12 is displayed at the position substantially matching the opening portion 200b, and the frame body pattern 13 is displayed at the position substantially matching the opening portion 200c.

Therefore, in the "adjustment mode", the adjusting person who sees the display screen 101 covered with the exterior component as shown in FIG. 5 can easily see the relative deviation in terms of position between the frame body pattern 11 and the opening portion 200a and the distortion of the shape of the opening portion 200a. Likewise, the adjusting person can see the deviation in terms of position between the frame body pattern 12 and the opening portion 200b and the distortion of the shape of the opening portion 200b, and the deviation in terms of position between the frame body pattern 13 and the opening portion 200c and the distortion of the shape of the opening portion 200c.

In the "adjustment mode", the microcomputer 111 can receive input operation from a user such as an adjusting person while the display screen 101 as shown in FIG. 5 is covered with the exterior component and is displayed. More specifically, when the adjusting person operates the operation unit 130, the display positions of the frame body patterns 11, 12, and 13 can be individually moved in the horizontal direction along the X axis and in the vertical direction along the Y axis direction. Further, in the shapes of the frame body patterns 11, 12, and 13, the display size in horizontal direction (width direction of the display screen 101) and the display size in the vertical direction (height direction of the display screen 101) can also be adjusted. With this operation, adjustment can be performed so that the frame body pattern 11 matches the opening portion 200a. Likewise, adjustment can be performed so that the frame body pattern 12 matches the opening portion 200b, and adjustment can be performed so that the frame body pattern 13 matches the opening portion 200c.

In the content of the adjustment in the "adjustment mode", the amount of change is saved as a parameter to the parameter storage unit DB3. Then, when the display screen 101 as shown in FIG. 3 is displayed in the "normal mode", the parameter saved in the parameter storage unit DB3 is reflected in the display mode. More specifically, the deviation in terms of position between the speedometer display unit 102 and the opening portion 200a is corrected, and further, the shape of the display pattern of the speedometer display unit 102 is corrected so that the distortion of the opening portion 200a becomes inconspicuous. Likewise, the influence of the deviation in terms of position between the boost meter display unit 103 and the opening portion 200b and the distortion of the opening portion 200b is corrected, and the influence of the deviation in terms of position between the fuel gauge display unit 104 and the opening portion 200c and the distortion of the opening portion 200c is corrected.

[Explanation about Specific Operation]

The operation shown in FIG. 1 will be explained.

For example, the operation in the "adjustment mode" in FIG. 1 can be executed when the meter unit 100 is initially turned on in the initial state. The operation in the "adjustment mode" in FIG. 1 can also be executed when the operation unit 130 is connected to the I/O unit 114 or a predetermined command is given from the operation unit 130 to the microcomputer 111. The "normal mode" is executed in a mode other than the "adjustment mode".

[Operation in "Adjustment Mode"]

When the operation in the "adjustment mode" is started, first, the microcomputer 111 executes initialization in step S11. More specifically, all the display on the display screen 101 is erased. In addition, various kinds of parameters are initialized as necessary.

In step S12, the microcomputer 111 obtains the pattern data of the frame body patterns 11, 12, and 13 held in the shape storage unit DB1, and displays the frame body patterns 11, 12, and 13 on the display screen 101 on the basis of the pattern data.

In the initial state in which correction is not performed according to the parameters in the parameter storage unit DB3, the position where the frame body pattern 11 is displayed is defined to be the position matching the speedometer display unit 102 and the opening portion 200a on the basis of the reference position on the design in a case where there does not exist any deviation in terms of position between the speedometer display unit 102 and the opening portion 200a. The display size in the horizontal direction and the vertical direction of the frame body pattern 11 is also defined to match the shape and the size of the opening portion 200a on the design in a case where there is no distortion in the shape of the opening portion 200a. More specifically, the initial display position, the initial display size, and the initial pattern shape of the frame body pattern 11 are defined on the basis of the constants determined in advance. However, when the parameter for position correction is already registered in the parameter storage unit DB3, the display position of the frame body pattern 11 is moved to a position away from the reference position in accordance with the parameter. When the parameter for display size correction in the horizontal direction or in the vertical direction is already registered in the parameter storage unit DB3, the display size of the frame body pattern 11, which is to be displayed, in the horizontal direction or in the vertical direction is changed in accordance with the parameter.

Likewise, in the initial state, the display position of the frame body pattern 12 is defined to be the position matching the boost meter display unit 103 and the opening portion 200b on the basis of the reference position on the design in a case where there does not exist any deviation in terms of position between the boost meter display unit 103 and the opening portion 200b. The display size of the frame body pattern 12 in the horizontal direction and in the vertical direction is defined so as to match the shape and the size of the opening portion 200b on the design in a case where there is no distortion in the shape of the opening portion 200b.

In the initial state, the display position of the frame body pattern 13 is defined to be the position matching the fuel gauge display unit 104 and the opening portion 200c on the basis of the reference position on the design in a case where there does not exist any deviation in terms of position between the fuel gauge display unit 104 and the opening portion 200c. The display size of the frame body pattern 13 in the horizontal direction and in the vertical direction is defined to match the shape and the size of the opening portion 200c on the design in a case where there is no distortion in the shape of the opening portion 200c.

As a result of the execution of step S12, the frame body patterns 11, 12, and 13 are displayed on the display screen 101 as shown in FIG. 5 such that the frame body patterns 11, 12, and 13 appear in the portions of the opening portions 200a, 200b, 200c, respectively of the exterior component 200, and the microcomputer 111 is ready to receive input operation from the adjusting person.

More specifically, in step S13 subsequent thereto, the microcomputer 111 receives input operation from the operation unit 130 connected to the I/O unit 114. The adjusting person can give a command as shown below to the microcomputer 111 by operating the buttons, not shown, on the operation unit 130.

(1) Select any one of the frame body patterns 11, 12, and 13 as an adjustment target.

(2) Move the display position of the selected frame body pattern in the horizontal direction and in the vertical direction on the screen.

(3) The display size of the selected frame body pattern in the horizontal direction is increased or decreased.

(4) The display size of the selected frame body pattern in the vertical direction is increased or decreased.

(5) The execution in the adjustment mode is terminated.

In step S14, the microcomputer 111 adjusts the parameter associated with the selected frame body pattern in accordance with input operation given with the operation unit 130 received in S13. The adjustable parameters include an adjustment value (P11) of the reference position coordinate, a display size adjustment value (P12) in the horizontal direction, and a display size adjustment value (P13) in the vertical direction.

In step S15, the microcomputer 111 reflects, on the screen display of the frame body patterns 11 to 13, the values of the adjusted parameters which have been adjusted independently for the measuring instruments in S14. For example, when the display of the frame body pattern 11 is updated, this is done as follows. On the basis of the parameters P11, P12, P13 associated with the frame body pattern 11, the display position of the frame body pattern 11 is moved in accordance with the parameter P11, the display size of the frame body pattern 11 in the horizontal direction is changed in accordance with the parameter P12, and the display size of the frame body pattern 11 in the vertical direction is changed in accordance with the parameter P13.

The processing in S13 to S16 is repeated until a command for terminating the adjustment mode is given from the operation unit 130. During this repetition, the adjusting person can perform adjustment with easy operation so that the frame body patterns 11, 12, and 13 displayed on the display screen 101 match the positions and the shapes of the opening portions 200a, 200b, and 200c, respectively.

When the command for terminating the adjustment mode is given from the operation unit 130, the microcomputer 111 proceeds to S17 from S16. Then, the microcomputer 111 saves the adjusted parameters to the parameter storage unit DB3. The microcomputer 111 erases the display of the display screen 101.

[Operation in "Normal Mode"]

For example, when the meter unit 100 is turned on, the microcomputer 111 starts operation in the "normal mode", and first executes the initialization in step S21. More specifically, all the display of the display screen 101 is erased. In addition, various kinds of parameters are initialized as necessary.

In step S22, the microcomputer 111 obtains information about the parameters associated with the measuring instruments displayed on the speedometer display unit 102, the boost meter display unit 103, and the fuel gauge display unit 104 (P11, P12, P13 for the measuring instruments) from the parameter storage unit DB3.

In step S23, the microcomputer 111 draws the measuring instruments on the display screen 101 by using information about the indicating needle pattern, the scale pattern, the character pattern, and the layout held in the measuring instrument information storage unit DB2. In addition, information about the parameters obtained in S22 is reflected in the display content of the measuring instruments.

For example, in a case where the pattern of the speedometer is drawn in the area of the speedometer display unit 102, the actual display position is changed to a position which is deviated by the adjustment value (P11) of the reference position coordinate with respect to the reference position of the speedometer on the design. In the case where the pattern of the speedometer is drawn, the actual display shape and the actual display size are changed by the display size adjustment value (P12) in the horizontal direction and the display size adjustment value (P13) in the vertical direction with respect to the display shape and the display size on the design.

In step S24, the microcomputer 111 processes various kinds of information received via the I/O unit 114 from the vehicle, and obtains the information about the display target, and more specifically, the microcomputer 111 obtains the latest information about the current vehicle speed, the current boost value, the currently remaining fuel, the total travel distance, the trip distance, and the like.

In step S25, the microcomputer 111 updates the display content so that the values of the latest information obtained in S24 are reflected in the display content of the measuring instruments, and changes the display position of the indicating needle of each measuring instrument and the numerical values displayed.

[Advantages of Meter Unit 100 Having Display Control Device]

When the display control device carrying out the control as shown in FIG. 1 is provided in the meter unit 100, the following advantage is obtained: even when the meter unit 100 employs such design that the measuring instruments are exposed only in the portions of the opening portions 200a, 200b, 200c of the exterior component 200 as shown in FIG. 3, the measuring instruments of the speedometer display unit 102, the boost meter display unit 103, the fuel gauge display unit 104, and the like can be caused to accurately match the positions and the shapes of the actual opening portions by performing simple adjustment operation. In particular, the frame body patterns 11 to 13 similar to the external shape of the measuring instruments and the opening portions 200a, 200b, 200c are displayed on the display screen 101 in the "adjustment mode", and therefore, the work of the adjustment is extremely easy. Even when the deviation in terms of position and the distortion occurs in the exterior component 200, it is not necessary to replace the exterior component 200, and therefore, the burden in the production process is reduced, and further the yield is further improved, so that the cost can be reduced. The display size of each measuring instrument in the horizontal direction and in the vertical direction can be adjusted according to the individual parameter, and therefore, even when distortion occurs in the opening shape, the display of the measuring instrument can be appropriately adjusted in accordance with the actual shape of the exterior component 200.

It should be noted that the operation unit 130 used for input operation in the adjustment mode can be changed as necessary. For example, input operation performed with any given operation unit provided in a device other than the meter unit 100 on the same vehicle may be input into the microcomputer 111 via the communication network on the vehicle.

The features of the embodiment of the display control device according to the present invention explained above will be hereinafter described by briefly summarizing the features in the following [1] to [3].

[1] A display control device including:

a display (liquid crystal display device 121) capable of displaying a measuring instrument (the speedometer display unit 102, the boost meter display unit 103, and the fuel gauge display unit 104);

an exterior component (200) which includes an opening portion (200a, 200b, 200c) making the measuring instrument displayed on the display to be visible and to which the display is attached;

a control unit (microcomputer 111) configured to control display of the display;

a parameter storage unit (DB3) capable of holding a parameter concerning the measuring instrument; and an input unit (operation unit 130) configured to receive input operation, wherein in an adjustment mode, the control unit displays, on the display, a frame body (frame body patterns 11, 12, 13) imitating a shape of the measuring instrument, changes a display position or/and a shape at which or in which the frame body is displayed, on the basis of input operation received by the input unit, and stores, to the parameter storage unit, the determined display position or/and the determined shape of the frame body as a parameter of the display position or/and the shape of the measuring instrument (adjustment values P11, P12, P13 of reference position coordinates), and in a normal display mode other than the adjustment mode, the control unit reflects the parameter held in the parameter storage unit as the display position or/and the shape of the measuring instrument displayed on the display.

[2] The display control device according to [1], wherein in the adjustment mode, the control unit displays frame bodies respectively corresponding to a plurality of measuring instruments at positions different from each other on the display, independently changes the display positions or/and the shapes of the frame bodies, and stores, to the parameter storage unit, the determined display positions or/and the determined shapes of the frame bodies as the parameters concerning the display positions or/and the shapes of the measuring instruments corresponding to the frame bodies, and in the normal display mode, the control unit displays the plurality of measuring instruments on the display.

[3] The display control device according to [1] or [2], wherein the frame bodies are similar to the shapes of the opening portions and are slightly smaller than the opening portions, and two crossing line segments are drawn inside of the frame bodies.

In the display control device according to one aspect of the present invention, even when the opening portion of the exterior component is deviated from the design value in terms of position, or there is deviation in terms of position between the display and the opening portion during attachment, the positions can be easily corrected so that the normal display position of the measuring instrument is positioned in the central part of the opening portion. More specifically, when the adjustment mode is used, an adjusting person can perform operation while he/she sees the indication on the display so that the display position of the frame body matches the position of the opening portion of the exterior component. As a result of this operation, values including the amount of change of the display position are stored to the parameter storage unit as the position parameter. Then, in the normal display mode, the parameter is reflected in the display position of the measuring instrument displayed on the display, and therefore, the display position can be changed to match the position of the actual opening portion.

In the display control device according to one aspect of the present invention, even when not only deviation in terms of position occurs but also distortion occurs in the shape of the opening portion, the display shape of the measuring instrument can be adjusted to match the shape of the actual opening portion. Therefore, the yield of the exterior components can be effectively improved, and extra replacement work can be reduced, and therefore, the production cost can be reduced.

In the display control device according to another aspect of the present invention, even when the exterior component employs such design that multiple measuring instruments are displayed at positions of multiple independent opening portions, the position of each of the multiple measuring instruments can be adjusted individually. Therefore, various designs can be employed, and in addition, the yield of the exterior component can be prevented from decreasing.

In the display control device according to still another aspect of the present invention, the adjusting person can easily adjust the position of the frame body with respect to the opening portion by moving the frame body so that it fits within the opening portion by using the point where two line segments cross each other as a mark.

According to the display control device of the present invention, the influence of the deviation in terms of position that occurs when the exterior component is formed and the deviation in terms of position during attachment of components can be solved by performing only a simple operation. More specifically, when the adjustment mode is used, the adjusting person can perform operation while he/she sees the indication on the display so that the display position of the frame body matches the position of the opening portion of the exterior component, and as a result of this operation, the amount of change of the display position is stored to the parameter storage unit as the parameter. Then, in the normal display mode, the parameter is reflected in the display position of the measuring instrument displayed on the display, and therefore, the display position can be changed to match the position of the actual opening portion.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display control device comprising:
a display configured to display a measuring instrument;
an exterior component attached to the display, the exterior component having an opening through which the measuring instrument is visible;
a control unit configured to control the display;
a parameter storage unit configured to store a parameter of the measuring instrument; and
an input unit configured to receive an input operation, wherein
in an adjustment mode, the control unit is configured to display a frame body imitating a shape of the measuring instrument on the display based on the opening, change a display position and/or a shape of the frame body according to an input operation received by the input unit, and store a determined display position and/or the determined shape of the frame body to the parameter storage unit as the parameter of the display position and/or the shape of the measuring instrument, and
in a normal display mode other than the adjustment mode, the control unit is configured to display the measuring instrument on the display according to the parameter stored in the parameter storage unit.

2. The display control device according to claim 1, wherein
in the adjustment mode, the control unit is configured to display frame bodies respectively corresponding to a plurality of measuring instruments at positions different from each other on the display, change the display positions and/or the shapes of the frame bodies independently of the other frame bodies based openings of the exterior component, and store the determined display positions and/or the determined shapes of the frame bodies to the parameter storage unit as the parameters of the display positions and/or the shapes of the measuring instruments corresponding to the frame bodies, and
in the normal display mode, the control unit is configured to display the plurality of measuring instruments on the display according to the stored parameters.

3. The display control device according to claim 2, wherein frame bodies are similar to the shapes of the plurality of opening portions and are slightly smaller than the plurality of opening portions, and two crossing line segments are formed inside the plurality of frame bodies.

4. The display control device according to claim 1, wherein the frame body is similar to the shapes of the opening portion and is slightly smaller than the opening portion, and two crossing line segments are formed inside the plurality of frame body.

5. The display control device according to claim 1, wherein the parameter includes at least one from among an adjustment value of a reference position coordinate, a display size adjustment value in a horizontal direction, and a display size adjustment value in a vertical direction.

6. The display control device of claim 1, wherein the exterior component includes a plurality of openings through which a plurality of measuring units are displayed, and each opening display a separate measuring unit.

7. A method of controlling a display device including an exterior component attached to the display, the exterior component having an opening through which a measuring unit is visible, the method comprising:
in an adjustment mode, controlling the display to display a frame body imitating a shape of the measuring unit based on the opening on the display, receiving an input, changing a display position and/or a shape of the frame body according to the received input, determining a display position and/or a determined shape of the frame body, and storing a parameter of the determined display position and/or the determined shape of the frame body; and
in a normal display mode, controlling the display to display the measuring instrument on the display according to the stored parameter.

* * * * *

UNITED STATES PATENT AND TRADEMARK OFFICE
CERTIFICATE OF CORRECTION

| | |
|---|---|
| PATENT NO. | : 9,120,380 B2 |
| APPLICATION NO. | : 14/488892 |
| DATED | : September 1, 2015 |
| INVENTOR(S) | : Ryo Kobayashi |

Page 1 of 1

It is certified that error appears in the above-identified patent and that said Letters Patent is hereby corrected as shown below:

Title Page

(72) Inventor: Delete "Ryo Kobayashi, Shimada (JP)" and insert --Ryo Kobayashi, Shizuoka (JP)--

Signed and Sealed this
Nineteenth Day of April, 2016

Michelle K. Lee
*Director of the United States Patent and Trademark Office*